United States Patent [19]

Burdsall et al.

[11] Patent Number: 6,067,783
[45] Date of Patent: May 30, 2000

[54] VEGETATION DEFLECTING DEVICE FOR A MULTI-BLADE ROTARY MOWER

[75] Inventors: Thomas A Burdsall, Nashville; Donald G Erickson, Antioch; James F Peterson, Franklin, all of Tenn.

[73] Assignee: Murray, Inc., Brentwood, Tenn.

[21] Appl. No.: 09/084,495

[22] Filed: May 27, 1998

[51] Int. Cl.[7] .................................................. A01D 34/64
[52] U.S. Cl. .......................................... 56/17.3; 56/320.1
[58] Field of Search ............................. 56/17.3, 2, 320.1, 56/DIG. 5

[56] References Cited

U.S. PATENT DOCUMENTS

| | | |
|---|---|---|
| 3,197,950 | 8/1965 | Griffith . |
| 3,197,951 | 8/1965 | Zick . |
| 4,856,265 | 8/1989 | Wolf . |
| 5,090,183 | 2/1992 | Thorud et al. ................................. 56/2 |
| 5,133,176 | 7/1992 | Baumann et al. . |
| 5,205,112 | 4/1993 | Tillotson et al. . |
| 5,212,938 | 5/1993 | Zenner et al. ......................... 56/320.1 |
| 5,305,589 | 4/1994 | Rodriguez et al. .................... 56/320.1 |

*Primary Examiner*—H. Shackelford
*Assistant Examiner*—Arpad Fabian Kovacs
*Attorney, Agent, or Firm*—Pillsbury Madison & Sutro LLP

[57] ABSTRACT

A device is secured to the deck of a multi-blade rotary mower at a location forwardly of the blades in relation to the direction the mower moves as vegetation in being cut. The device deflects the grass laterally into the cutting paths of the rotating blades.

1 Claim, 1 Drawing Sheet

VEGETATION DEFLECTING DEVICE FOR A MULTI-BLADE ROTARY MOWER

BACKGROUND OF THE INVENTION

1. Field of the Invention

The present invention relates to a device used with a multi-blade rotary mower so as to eliminate an uncut strip of vegetation from being left behind the blades during mowing.

2. Prior Art

Multi-blade mowers are commonly used in order to cut wide swaths of vegetation. It has been recognized (for example, in U.S. Pat. No. 5,133,176, issued on Jul. 28, 1992 to James R. Baumann et al.) that when multiple blades are placed side-by-side, an uncut strip of grass is left behind the blades during the mowing operation. This problem is addressed in U.S. Pat. No. 5,133,176 by providing an additional trimming blade which is positioned forwardly of the main cutting blades, and equidistant from their rotational axes, so as to cut a grass strip which otherwise would be missed by the main cutting blades as the mower travels over the grass being mowed.

Another approach conventionally used in multi-blade mowers is to stagger the blades forwardly and aft relative to the direction the mower moves whereby the rotating blades describe respective overlapping cutting paths as the mower passes over the vegetation being cut. Although such an arrangement reduces the likelihood of an uncut strip being left behind the blades, it does not eliminate the problem entirely.

SUMMARY OF THE INVENTION

The present invention is a vegetation deflecting device which is secured to the cutting deck of a mower at a location forwardly of a pair of rotating blades. As the mower moves, the deflecting device displaces the vegetation laterally into the cutting paths of the rotating mower blades whereby no uncut strips are left behind the blades.

BRIEF DESCRIPTION OF THE DRAWINGS

The invention will be described in greater detail with respect to the accompanying drawing wherein.

DETAILED DESCRIPTION OF THE PREFERRED EMBODIMENT OF THE INVENTION

Figure 1:
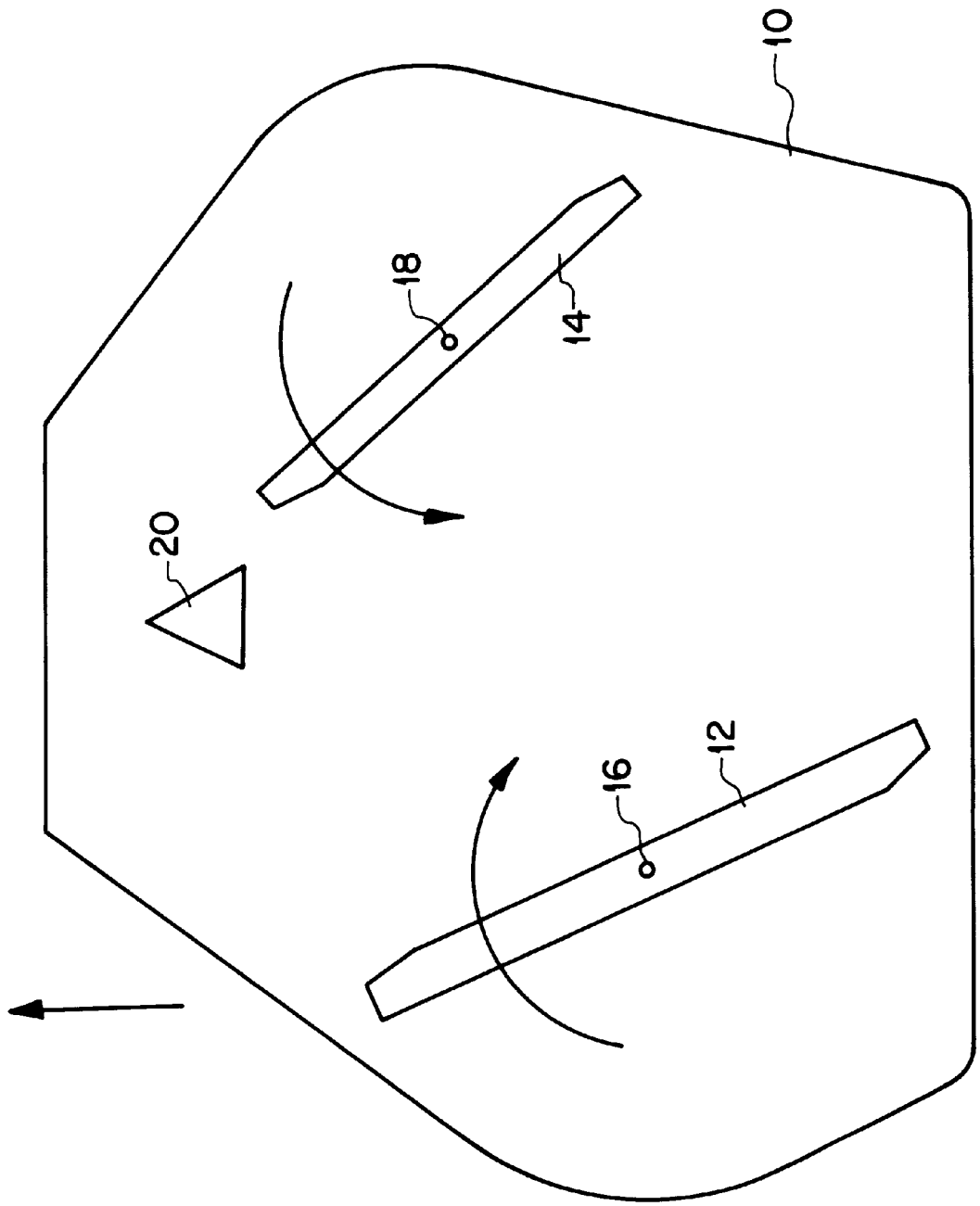
FIG. 1 is a bottom plan view of a mower cutting deck which supports multiple cutting blades and a vegetation deflecting device.

Although the present invention can be used when cutting different types of vegetation, it is primarily intended to improve a mower's performance when cutting grass. Therefore, the following description will be directed to the invention's use in a rotary lawnmower.

Referring to FIG. 1, the underside of a mower cutting deck 10 is shown. For convenience of illustration, and because they form no part of the present invention, various conventional components of the mower are not shown. Within deck 10 cutting blades 12 and 14 are arranged to rotate in opposite directions about their respective axes of rotation 16 and 18. In the present description, blades 12 and 14 are staggered fore and aft with respect to the direction of movement of the deck 10 during mowing. Such direction of movement is indicated by the arrow shown in FIG. 1. It will be understood, however, that the blades also can be arranged in side-by-side relationship and that the blades can rotate in the same direction.

A grass deflecting device 20 is secured to deck 10 at a location ahead of blades 12 and 14 in the direction of the mower's movement. Additionally, the deflecting device is substantially centered between the paths of movement described by the blades' rotational axes 16 and 18 as the cutting deck travels during mowing.

Device 20 has a wedge-shaped configuration so as to laterally displace the grass it encounters into the cutting paths of blades 12 and 14. As a result, all of the grass within the span of the blades' cutting paths is cut, and no grass is left behind as an uncut strip.

What is claimed is:

1. A multi-blade rotary mower having a cutting deck and at least one pair of cutting blades disposed within the deck and rotatable about respective axes, the mower including:

a vegetation deflecting device secured to said deck at a location forwardly of said blades in relation to a direction of movement of the deck during mowing and substantially midway between paths of travel described by adjacent rotational axes of the blades as the deck moves, said deflecting device being substantially wedge-shaped, and having a narrowed forward end extending in said direction of movement of the deck during mowing, so as to deflect uncut vegetation laterally into the paths of rotation of said blades.

* * * * *